United States Patent
Kaneko et al.

[11] Patent Number: 6,124,925
[45] Date of Patent: Sep. 26, 2000

[54] TIRE CONFIGURATION JUDGING DEVICE AND TIRE CLASSIFYING METHOD USING THE SAME

[75] Inventors: Tomoyuki Kaneko; Tokuhiro Murayama, both of Tokyo, Japan

[73] Assignee: Bridgestone Corporation, Tokyo, Japan

[21] Appl. No.: 09/185,593

[22] Filed: Nov. 4, 1998

[30] Foreign Application Priority Data

Nov. 6, 1997 [JP] Japan ................................ 9-304400

[51] Int. Cl.⁷ ........................... G01N 21/00; G01B 11/00
[52] U.S. Cl. ........................................ 356/237.1; 356/394
[58] Field of Search ................................ 356/237.1, 394, 356/398, 376, 384, 385; 385/4, 7, 1, 14, 12; 358/93, 101, 107; 382/8; 250/559.39, 559.44

[56] References Cited

U.S. PATENT DOCUMENTS

| | | | |
|---|---|---|---|
| 3,801,957 | 4/1974 | Hogan | 340/146.3 F |
| 4,727,419 | 2/1988 | Yamada et al. | 358/101 |
| 4,778,060 | 10/1988 | Wessner, Jr. | 209/3.3 |
| 5,054,918 | 10/1991 | Downing et al. | 356/152 |
| 5,121,438 | 6/1992 | Kawauchi et al. | 382/8 |
| 5,121,449 | 6/1992 | Shiba et al. | 385/14 |

*Primary Examiner*—Frank G. Font
*Assistant Examiner*—Michael P. Stafira
*Attorney, Agent, or Firm*—Sughrue, Mion, Zinn, Macpeak & Seas, PLLC

[57] ABSTRACT

A tire configuration judging device according to the present invention comprises a light projecting (emitting) device, a photographing device, and a control device. The light projecting device irradiates slit light onto a bead portion of a tire. The photographing device photographs a slit image which is formed on the tire. The control device forms an image to be judged which represents an external configuration of the bead portion of the tire, by applying a 2-D coordinate conversion to image data for the slit image which is photographed by the photographing device. The image to be judged and a predetermined reference image are compared to each other by a comparing device such that quality of the tire is judged, and the tire is classified as a normal tire or an abnormal tire according to results of comparison.

7 Claims, 6 Drawing Sheets

TIRE CONFIGURATION JUDGING DEVICE AND TIRE CLASSIFYING METHOD USING THE SAME

BACKGROUND OF THE INVENTION

1. Field of the Invention

The present invention relates to a tire configuration judging device and a tire classifying method using the same. More specifically it relates to a tire configuration judging device which judges the quality of a tire by mechanically detecting the configurations of the bead portions or the like of the tire and to a tire classifying method in which a tire whose quality has been judged is classified as a normal tire or an abnormal tire.

2. Description of the Related Art

Conventionally, after the completion of the manufacturing of a tire, it is determined whether the produced tire (which will be called only a "tire" hereinafter) is suitable as a structural part of a vehicle, i.e., it is judged whether the tire is a normal tire or an abnormal tire. At this time, an operator determines the configurations of tires and judges their quality by observing and touching the tires one by one.

However, conventionally, the determination of the configuration of a tire and the judgment on the quality thereof have relied on manual work by an operator. For this reason, there arises the problem that the results of the judgment on the quality of a tire may vary depending upon how much the operator is experienced or the like.

Further, in the determination of the configuration of a tire, the operator determines the configuration of certain portions of the tire by rotating or turning over the tire. For this reason, when it comes to a tire having a large size or a heavy weight, it is an extremely hard work for the operator to handle such tire. In addition, since the judging of the quality of tires requires much concentration on the part of the operator, in a case in which such work must be continued for a prolonged time, there arises a problem that the operator suffers from physical or mental fatigue.

SUMMARY OF THE INVENTION

The present invention is suggested in order to overcome the above-described problems, and it is an object of the present invention to provide a tire configuration judging device in which the quality of a tire can be judged more simply and accurately than conventionally, and a method of correctly classifying a tire in accordance with the judgment on its quality which has been carried out by this device.

In order to achieve the aforementioned objects, in accordance with the first aspect of the present invention, there is provided a tire configuration judging device, comprising: light irradiating means which irradiates slit light onto a predetermined range of a tire surface, whose configuration is to be detected, of a tire; photographing means which is disposed at a predetermined position corresponding to the light irradiating means and which photographs a slit image formed on the tire surface by irradiation of the slit light by the light irradiating means; configuration detecting means which detects the configuration of the tire surface whose configuration is to be detected, on the basis of the slit image which is photographed by the photographing means; comparing means which compares the configuration which is detected by the configuration detecting means to a predetermined reference configuration; and judging means which judges the quality of the tire on the basis of the results of the comparison by the comparing means.

In accordance with the first aspect of the present invention, the light irradiating means which irradiates slit light onto the tire is provided at the tire configuration judging device. The light irradiating means irradiates the slit light within a predetermined range of the tire surface whose configuration is to be detected. The portion of the tire, whose surface configuration is to be detected, may be a bead portion, a tread portion or the like. In a case in which, for example, the tire surface at the bead portion is used as the surface whose configuration is to be detected, the slit light is irradiated onto the bead portion.

The tire configuration judging device has a photographing means which photographs a slit image which is formed on the tire by the slit light being irradiated onto the tire. The photographing means is disposed at a predetermined position that corresponds to the position of the light irradiating means. For example, a CCD camera may be used as the photographing means.

Further, the tire configuration judging device has a configuration detecting means which detects the configuration of a tire surface to be detected. The configuration detecting means detects the configuration of the tire by geometrically applying a two dimensional coordinate conversion or the like to image data obtained by the photographing of the slit image of the tire by the photographing means, on the basis of the positional relationship between the angle at which the slit light is irradiated by the light irradiating means and the angle at which the slit image is photographed by the photographing means.

In a normal tire, the configuration of the tire surface which is to be detected is predetermined (the predetermined configuration is referred to as a reference configuration). Therefore, the comparing means which is provided at the tire configuration judging device compares the tire configuration which is detected by the configuration detecting means with the predetermined reference configuration for that tire type. In short, the geometrical difference between the detected tire configuration and the reference configuration is measured.

On the basis of the results of the comparison by the comparing means, the judging means judges the quality of the tire. When the detected tire configuration and the reference configuration correspond to each other (i.e., when the difference is within a tolerance), the examined tire is determined to be normal. On the other hand, when the detected tire configuration and the reference configuration do not correspond to each other (i.e., when the magnitude of the difference exceeds the tolerance), the examined tire is determined to be abnormal.

As described above, a quantitative criterion is predetermined as a reference so that the judgment on the quality of the tire can be carried out mechanically. Accordingly, not only can a reliable judgment always be obtained, but also, the amount of labor by the operator can be greatly reduced. As a result, the quality of the tire can be judged much more simply and accurately than by a conventional method.

In accordance with the second aspect of the present invention, there is provided a tire configuration judging device according to the first aspect of the present invention, further comprising: rotation means which rotates, in a circumferential direction of the tire, light irradiating means, photographing means, and the tire relative to one another, such that the entire tire surface whose configuration is to be detected can be irradiated by the light irradiating means and photographed by the photographing means, to thereby obtain the configuration of the entire tire surface.

The rotation means can be structured such that, for example, the light irradiating means and the photographing means are fixed at predetermined positions, and the tire is placed on a rotation plate and is rotated in the circumferential direction thereof. Alternatively, the tire can be fixed at a predetermined position, and the light irradiating means and the photographing means are rotated in the circumferential direction of the tire.

Accordingly, the detection of the surface configuration over the entire circumferential region of the tire surface whose configuration is to be detected can be achieved without requiring manual rotation of the tire by the operator. As a result, the amount of labor by the operator is reduced, and the quality of the tire can be judged easily.

In accordance with the third aspect of the present invention, there is provided a tire classifying method, comprising: a tire type judging step in which a type of a tire is judged; a quality judging step in which a tire surface whose configuration is to be detected is examined along a circumferential direction of the tire to detect the configuration of the tire surface, the detected configuration is compared to a predetermined reference configuration corresponding to the type of the tire which has been judged in the tire type judging step, and the quality of the tire surface is judged according to the results of the comparison; and a classifying step in which the tire is classified as a normal or abnormal tire on the basis of the results of the judgment in the quality judging step.

In the above-described tire classifying method, the type of a tire is determined in the tire type judging step while the tire is being conveyed on a predetermined conveying path. The type of the tire is determined by the width or the wheel diameter of the tire which is indicated, for example, in relief on a sidewall portion of the tire. Accordingly, in the tire type judging step, the tire type can be judged by reading the indications formed in relief on the tire.

In the quality judging step, the quality of a tire is judged by detecting, in the circumferential direction of the tire, the configuration of a tire surface whose configuration is to be detected. Further, the quality judging step, by using the tire configuration judging device according to the first aspect of the present invention, the configuration of the tire surface whose configuration is to be detected is detected, and the quality of the tire is judged on the basis of the detected configuration. Namely, the quality of the tire is judged by comparing the detected configuration to the reference configuration which corresponds to the type of the tire which has been judged in the tire type judging step.

In this quality judging step, in a case in which a surface whose configuration is to be detected is each of the side surfaces of the tire (e.g., the bead portions), the tire is turned over after the configuration of one of the surfaces has been detected, and the configuration of the other surface is detected. As a result, the quality of both tire surfaces is judged.

Further, the above-described tire configuration judging device may be disposed at each side of the tire so that the configurations of both surfaces of the tire can be detected at the same time, to judge the quality of the tire. As a result, the step in which the tire is turned over can be omitted.

Moreover, in the tire classifying step, a tire is classified on the basis of the results of judgment of the quality judging step. As a result, a manufactured tire, after having been manufactured, can be easily classified as a normal tire or an abnormal tire.

DESCRIPTION OF THE PREFERRED EMBODIMENTS

Figure 1:
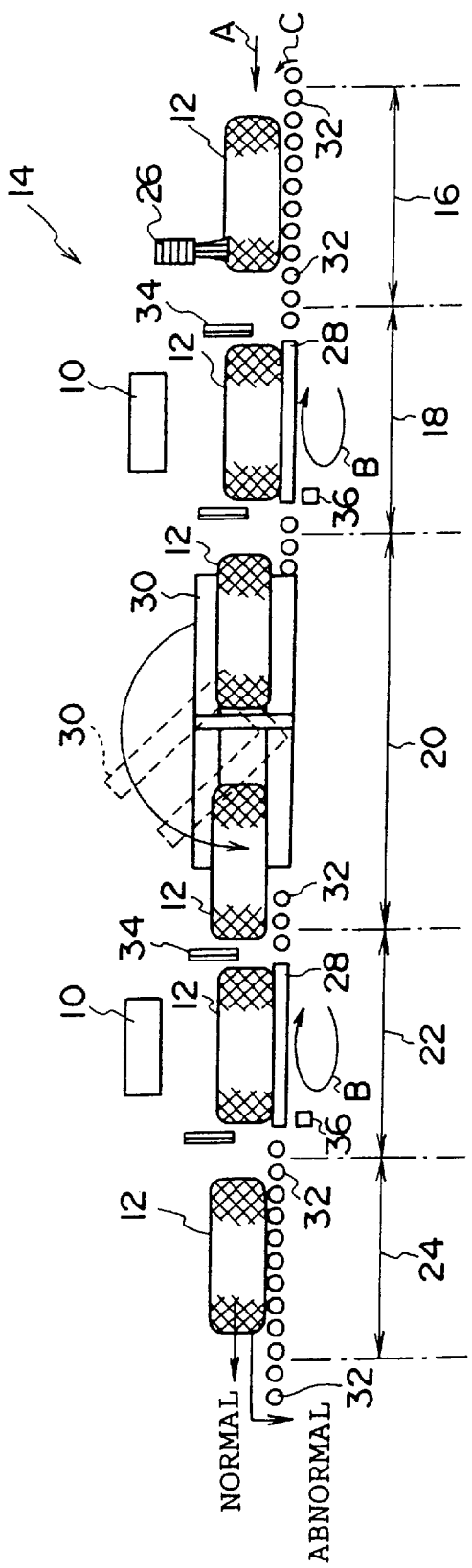
FIG. 1 is a schematic overall structural view of a tire classifying process system having a configuration judging device according to the present invention.

FIG. 1 illustrates a tire classifying process system 14 having configuration judging devices 10 for judging the quality of a tire 12 (whether the tire 12 is normal or abnormal) by detecting the configuration of the tire 12. Further, in the present embodiment, there is explained a case in which the external configurations of bead portions 12A of the tire 12 are detected, it is judged whether the tire 12 is normal or abnormal on the basis of the detected external configurations of the bead portions 12A, and the tire 12 is then classified as normal or abnormal.

As shown in FIG. 1, in the tire classifying process system 14, a plurality of rollers 32 are disposed along the conveying direction (the direction of arrow A) of the tire 12. A motor which is not shown is connected to each of the rollers 32. When the motor is rotated, each of the rollers 32 is rotated in the same direction (the direction of arrow C). Accordingly, the tire 12 is conveyed automatically in the direction of arrow A.

In the tire classifying process system 14, a tire type reading section 16, a top surface quality judging section 18, a tire turn-over section 20, a rear surface quality judging section 22, and a tire classifying section 24 are disposed sequentially in the conveying direction of the tire 12. In the present embodiment, the one side of the tire 12, on which side is formed an indication portion on which the type of the tire 12 is indicated in relief, is referred to as the top surface of the tire 12. The other side of the tire 12, on which side no indication portion is formed, is referred to as the rear surface of the tire 12. Accordingly, at the top surface quality judging section 18, the quality of the tire 12 is judged on the basis of the external configuration of the bead portion 12A at the top surface side of the tire 12. At the rear surface quality judging section 22, the quality of the tire 12 is judged on the basis of the external configuration of the bead portion 12A at the rear surface side of the tire 12.

An indication reading device 26 which reads an unillustrated indication portion of the tire is disposed at the tire type reading section 16. The indication portion is formed on the aforementioned top surface sidewall portion of the tire 12. The tread width, the wheel diameter and the like of the tire 12 are recorded in a carved relief on the indication portion. The indication reading device 26 reads this indication portion. Therefore, the type of the tire 12 which is now to be examined can be determined.

Further, when the type of the tire is indicated by using a bar code, it is preferable to provide a bar code sensor at the tire type reading section 16.

The configuration judging device 10, a pair of push-off devices 34, and a rotation plate 28 are provided at the top surface quality judging section 18.

The rotation plate 28 is disposed in such a manner that the surface of the rotation plate 28 on which the tire 12 is placed is disposed parallel to the aforementioned plurality of rollers 32. Accordingly, the tire 12, which is conveyed by the rollers 32 being rotated, is placed on the rotation plate 28. Further, the rotation plate 28 is disposed so as to be rotatable in the circumferential direction (in the direction of arrow B) of the tire 12. Moreover, in the vicinity of the rotation plate 28, a pulse generating device 36 for detecting the state of rotation of the rotation plate 28 is disposed. By counting the number of pulse signals which are output during one rotation of the rotation plate 28, it can be determined whether the judgment on the quality of the surface of the tire 12 has been completed.

The configuration judging device 10 is disposed at a position opposed to the rotation plate 28 such that the tire 12 which has been conveyed to the top surface quality judging section 18 is located between the configuration judging device 10 and the rotation plate 28. This configuration judging device 10 detects the external configuration of the top surface bead portion 12A of the tire 12 and judges the quality of the tire 12 on the basis of the detected external configuration. Later on, a more detailed description of the configuration judging device 10 will be given.

The pair of the push-off devices 34 are provided between the configuration judging device 10 and the rotation plate 28 and are disposed at positions where the push-off devices 34 can both contact the tire 12 during operation. The pair of the push-off devices 34 are operated when the judgment of the quality of the tire 12 by the configuration judging device 10 is completed, and push the tire 12 off the rotation plate 28.

The tire turn-over section 20 is provided at a downstream side in the conveying direction of the tire 12 with respect to the top surface quality judging section 18. A substantially U-shaped tire holding member 30 having a recessed portion into which the tire 12 is inserted is disposed at the tire turn-over section 20. When the tire 12 is inserted into the recessed portion of the tire holding member 30, the tire holding member 30 is operated by the driving force of a motor (not shown) and is rotated 180° around a point on the conveying path of the tire 12. As a result, the tire 12 is turned over at the tire turn-over section 20. Namely, the tire 12 whose top surface was facing the configuration judging device 10 is turned over, and the rear surface of the tire 12 thereby faces the configuration judging device 10.

The configuration judging device 10, the pair of the push-off devices 34, and the rotation plate 28 are provided at the rear surface quality judging section 22. In the rear surface quality judging section 22, the configuration judging device 10 detects the external configuration of the rear surface bead portion 12A of the tire 12, and judges the quality of the tire 12 on the basis of the detected external configuration. Since the structure of the rear surface quality judging section 22 is substantially the same as that of the above-described top surface quality judging section 18, description thereof will be omitted.

The tire classifying section 24 classifies the tire 12 as a normal tire or an abnormal tire on the basis of the resulting judgments at the above-described top surface quality judging section 18 and rear surface quality judging section 22.

Hereinafter, a more detailed description of the configuration judging devices 10 which are provided at the top surface quality judging section 18 and the rear surface quality judging section 22 will be given.

Figure 2:
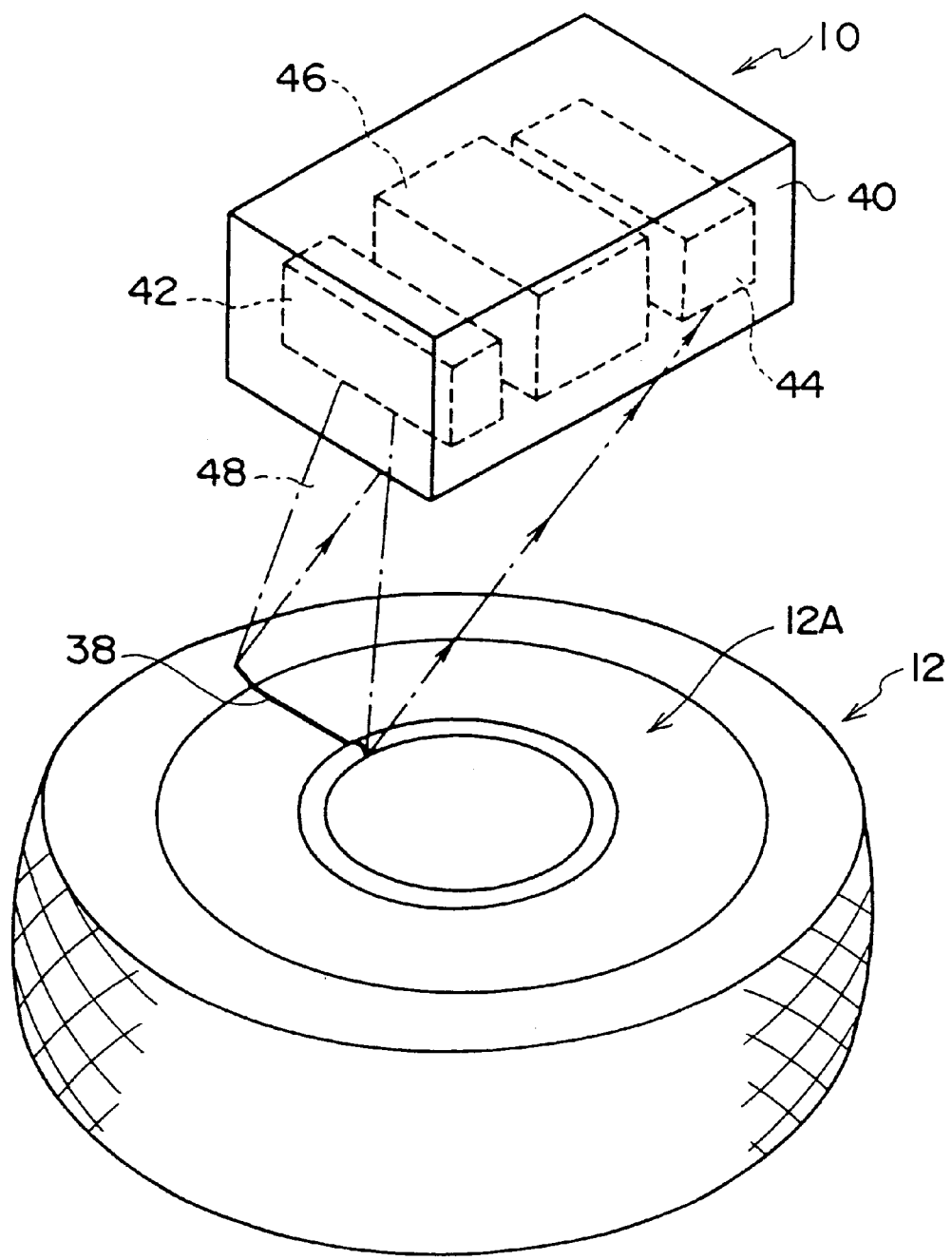
FIG. 2 is a schematic perspective view of the structure of the configuration judging device, and a tire.

As shown in FIG. 2, the internal devices of the configuration judging device 10 are housed in a substantially rectangular parallelpiped casing 40 and are thereby protected. A light projecting device 42, a photographing device 44, and a control device 46 are accommodated in the casing 40. A light emission window and a photography window (which are not shown) are formed at the surface of the casing, which surface faces the tire 12. The light emission window allows slit light 48 which is emitted from the light projecting device 42 to proceed to the exterior of the casing 40. The photography window is formed such that a slit image 38, which is formed on the tire 12 by the slit light 48 being irradiated onto the tire 12, can be photographed through the photography window.

The light projecting device 42 comprises a semiconductor laser as a light source, a collimator lens which is structured by a spherical lens for converging laser beams, and a cylindrical lens for diverging the converged beam in a single direction. Accordingly, the slit light 48 is emitted from the light projecting device 42, and the emitted slit light 48 is irradiated onto the bead portion 12A of the tire 12 through the light emission window of the casing 40.

The photographing device 44, for example, a CCD camera photographs the slit image 38 which is formed on the tire 12 by the irradiation of the slit light 48 emitted from the light projecting device 42. This photographing device 44 is connected to the control device 46. Accordingly, image data of the slit image 38 which has been photographed by the image photographing device 44, i.e., image data of the external configuration of the bead portion 12A of the tire 12, is outputted to the control device 46.

Figure 4:
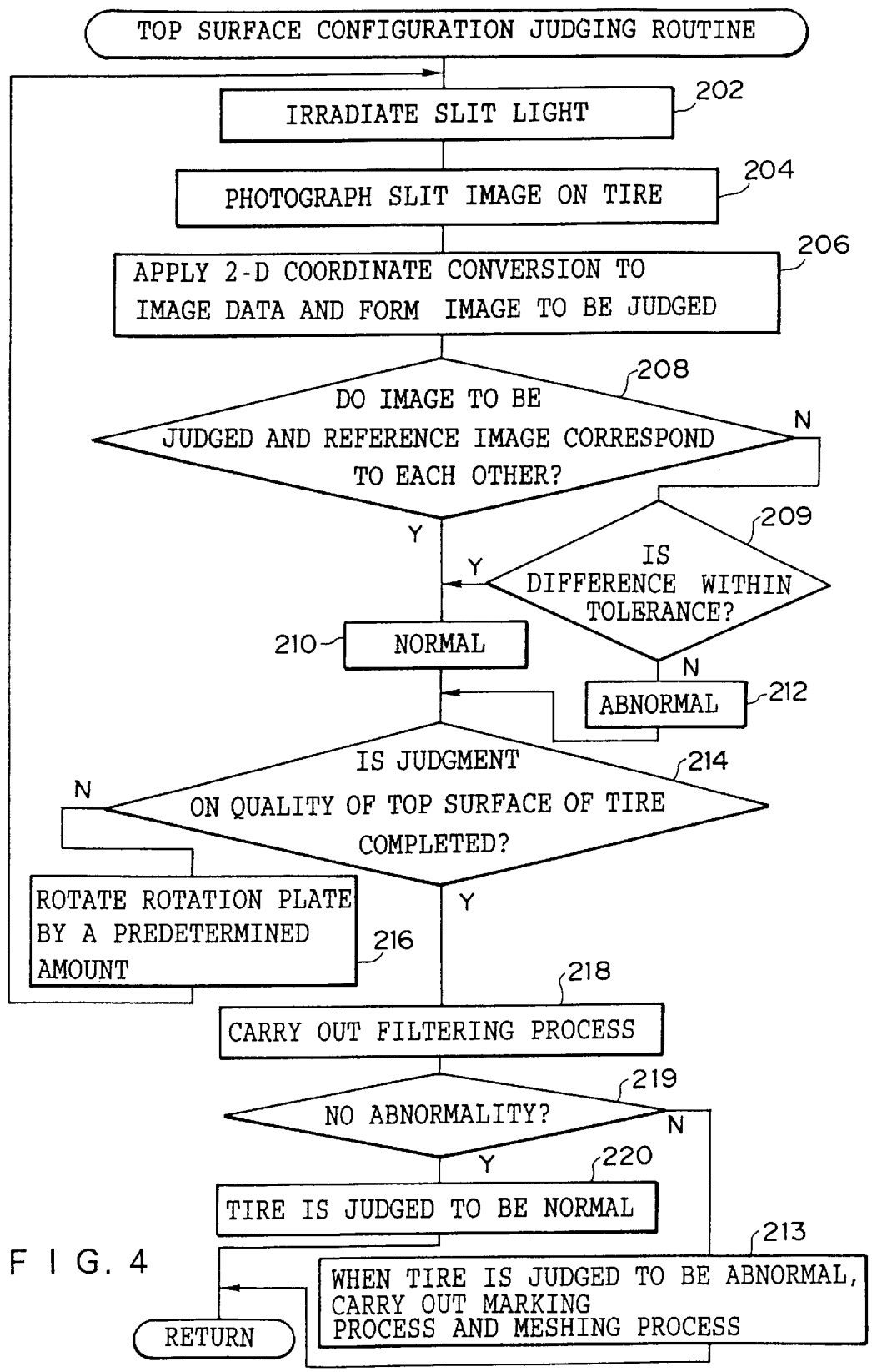
FIG. 4 is a flowchart which illustrates a top surface configuration judging routine in the configuration judging device.
Figure 5:
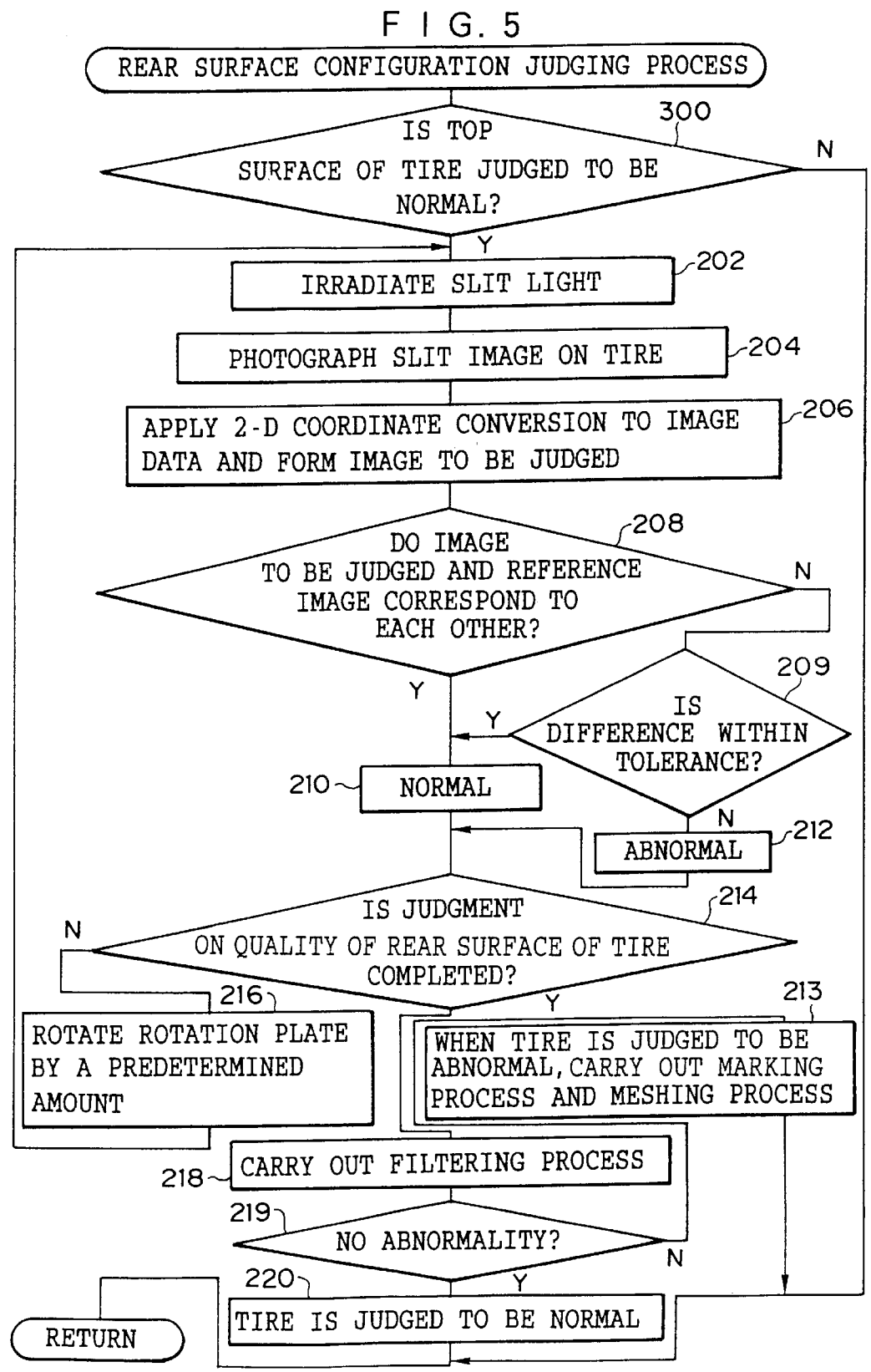
FIG. 5 is a flowchart which illustrates a rear surface configuration judging routine in the configuration judging device.

The control device 46 is formed by an unillustrated microcomputer which is structured by a CPU, a ROM, a RAM and an I/O port for inputting or outputting to or from external devices. A top surface configuration judging routine which is shown in FIG. 4 and a rear surface configuration judging routine which is shown in FIG. 5 are stored in advance in the control device 46. More specifically, the top surface configuration judging routine which is shown in FIG. 4 is stored in advance in the control device 46 of the configuration judging device 10 which is disposed at the top surface quality judging section 18. The rear surface configuration judging routine which is shown in FIG. 5 is stored in advance in the control device 46 of the configuration judging device 10 which is disposed at the rear surface quality judging section 22. In short, the control device 46 receives information on the detected external configuration of the bead portion 12A of the tire 12 and judges the quality of the tire 12 on the basis of the detected external configuration.

Figure 3:
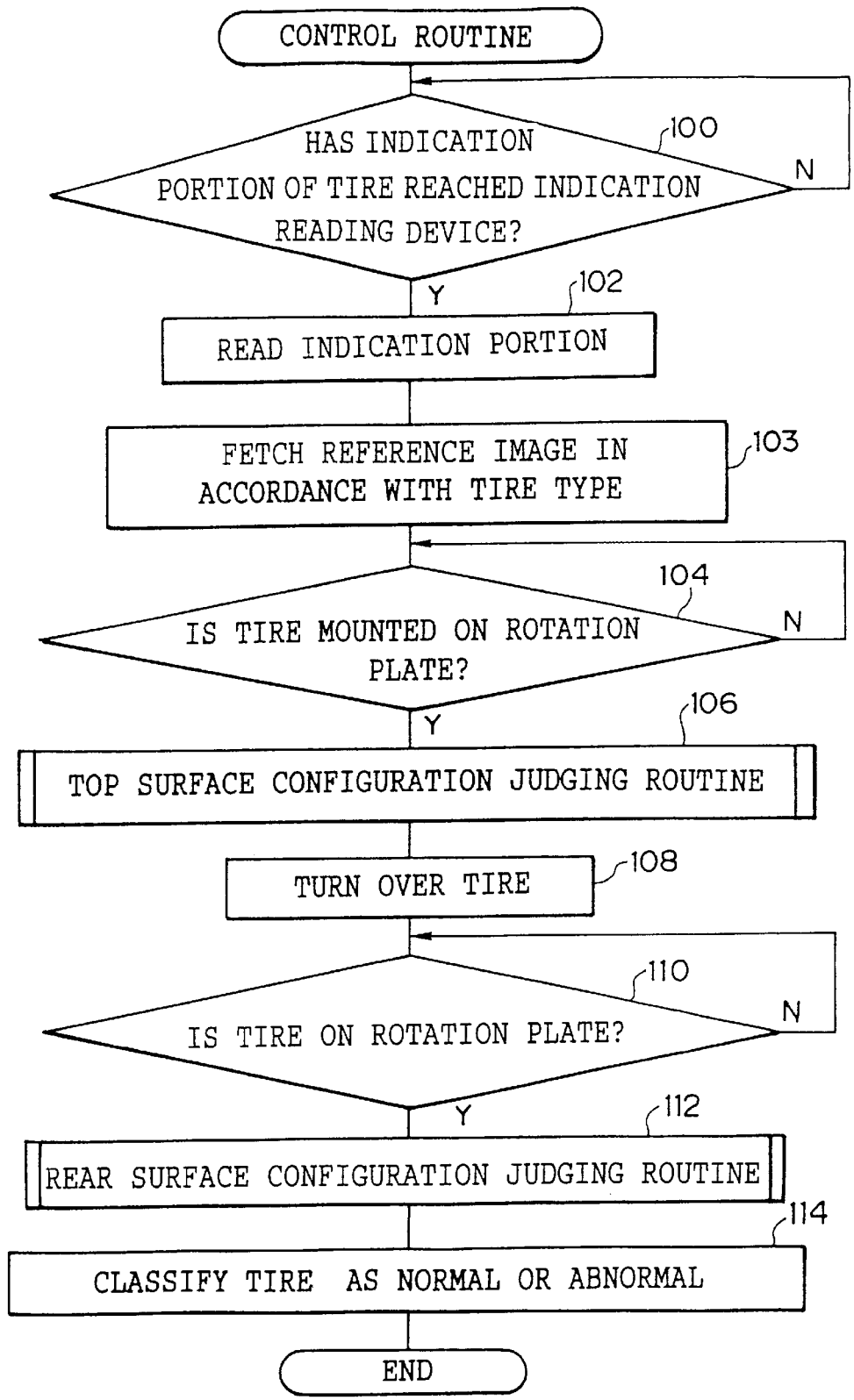
FIG. 3 is a flowchart which illustrates a control routine of the tire classifying process system.
Figure 6:
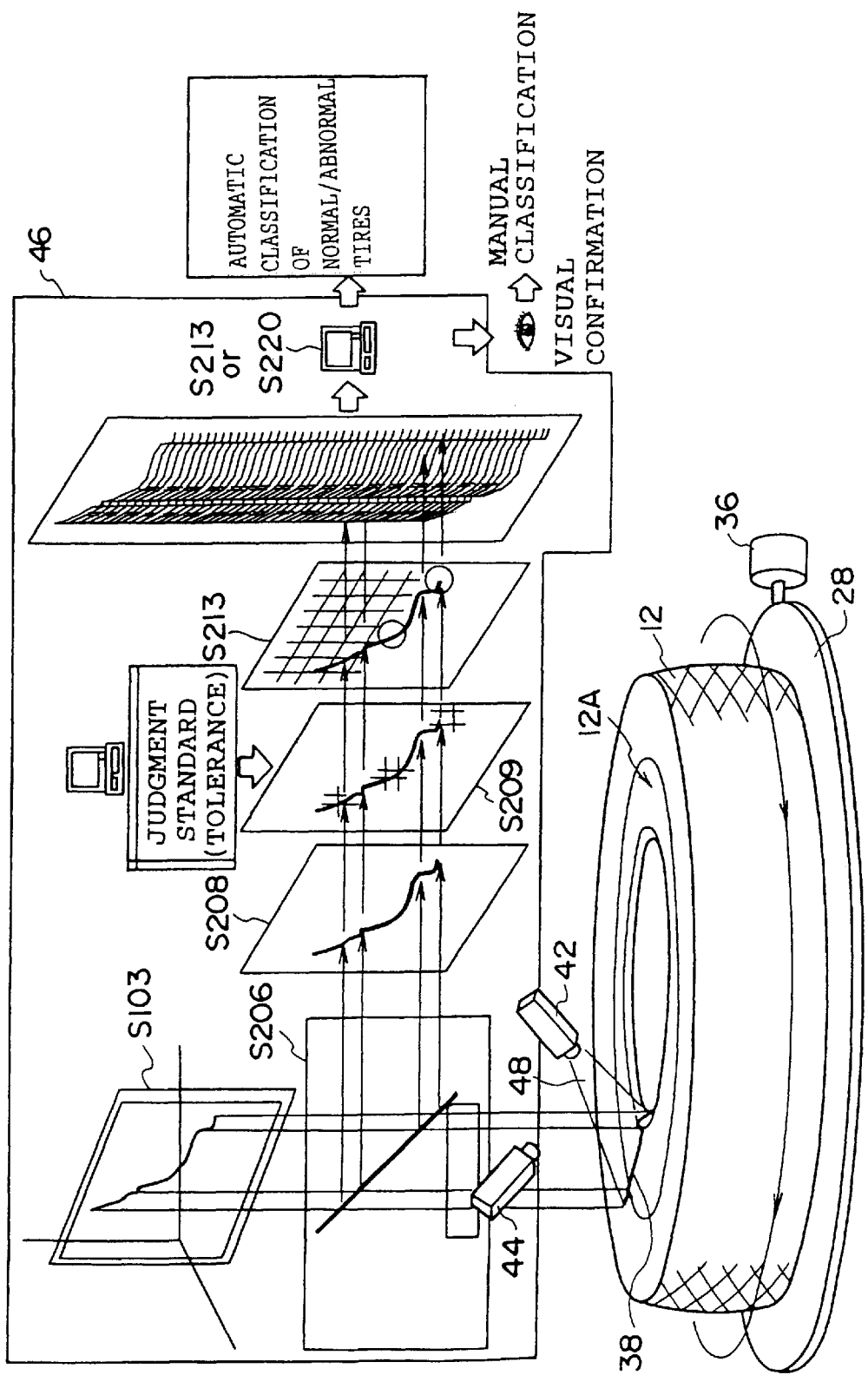
FIG. 6 is a schematic view which illustrates a process at a top surface quality judging section or a rear surface quality judging section of the tire classifying process system.

Next, operation of the present preferred embodiment will be described with reference to a control routine which is shown in FIG. 3, a top surface configuration judging routine which is shown in FIG. 4, and a rear surface configuration judging routine which is shown in FIG. 5. The control routine which is shown in FIG. 3 is stored in advance in an unillustrated controlling apparatus which controls the tire classifying process system 14. Further, the top surface configuration judging routine which is shown in FIG. 4 is stored in the control device 46 of the configuration judging device 10 at the top surface quality judging section 18. The rear surface configuration judging routine which is shown in FIG. 5 is stored in the control device 46 of the configuration judging device 10 at the rear surface quality judging section 22. Further, main processes of the aforementioned routines are exemplified by graphics in FIG. 6. The capital letter "S" in front of reference numerals in FIG. 6 stands for "Steps", i.e., the steps in the routines.

When it is detected that a tire 12 has been inserted into a tire insert opening (which is disposed at the right side in FIG.

1), in the tire classifying process system 14, the plurality of rollers 32 are driven by the motor (not shown) and rotated in the direction of arrow C. Accordingly, the tire 12 is automatically conveyed in the direction of arrow A. When the conveying of the tire 12 is started in this way, the control routine which is shown in FIG. 3 is executed.

In step 100, it is judged whether the tire 12 has reached the tire type reading section 16. More specifically, it is judged whether the indication portion on a sidewall portion of the tire 12 has reached the reading position below the indication reading device 26. The presence of the tire 12 at the reading position below the indication reading device 26 is detected by a sensor which is not shown. In step 100, when it is judged that the indication portion of the tire 12 has reached the reading position at which the indication portion is read by the indication reading device 26, the routine proceeds to step 102. In step 102, the indication portion of the tire 12 is read by the indication reading device 26. Accordingly, the type of the tire 12 can be judged. Next, in step 103, a reference image corresponding to the type of the tire 12 which was read in step 102 is fetched. A reference image is stored in advance for each type of tire.

Next, in step 104, it is judged by an unillustrated sensor whether the tire 12 is loaded at a predetermined position of the rotation plate 28 at the top surface quality judging section 18. In step 104, when the tire 12 has been judged to be loaded at a predetermined position of the rotation plate 28, the routine proceeds to step 106, where the top surface configuration judging routine is executed.

With reference to FIG. 4, the top surface configuration judging routine is explained hereinafter.

In step 202, the slit light 48 is emitted from the light projecting device 42 of the configuration judging device 10. The slit light 48 is thereby irradiated onto the bead portion 12A of the tire 12 which is loaded on the rotation plate 28 so that the slit image 38 is formed on the tire 12. In step 204, the slit image 38 which is formed on the tire 12 is photographed by the photographing device 44.

Next, in step 206, on the basis of the positional relationship between the angle at which the slit light 48 was irradiated and the angle at which the slit image 38 was photographed by the photographing device 44, a two dimensional coordinate conversion is geometrically applied to the image data for the slit image 38 which has been photographed by the photographing device 44. Accordingly, the external configuration (cross sectional configuration) of the tire 12 along the line on which the slit light 48 was irradiated can be reproduced. In the present embodiment, an image which is formed by geometrically applying a two dimensional coordinate conversion to the image data and which represents the external configuration of the bead portion 12A of the tire 12 is referred to as "an image to be judged".

Next, in step 208, the image to be judged which was formed in step 206 and the reference image which was fetched in step 103 are compared to each other by overlapping one on the other, and it is thereby judged whether they correspond to each other. When these images have been judged in step 208 to correspond to each other, in step 210, the bead portion 12A is determined to be normal.

On the other hand, when the image to be judged and the reference image are judged to not correspond to each other in step 208, the routine proceeds to step 209. In step 209, it is determined whether the geometrical difference between the image to be judged and the reference image is within a predetermined tolerance. The tolerance can be set in advance as desired in accordance with the conditions or the like of the tire. The smaller the tolerance, the better the accuracy for judging the quality of the tire 12. When the aforementioned geometrical difference is within the tolerance in step 209, the bead portion 12A is judged to be normal in step 210. On the other hand, when the difference exceeds the tolerance in step 209, the bead portion 12A is judged to be abnormal in step 212.

In step 214, it is judged whether the judgment on the quality of the entire top surface of the bead portion 12A of the tire 12 has been completed. Namely, it is determined whether the external configuration of the entire surface of the top surface bead portion 12A of the tire 12 has been detected and the quality judgment has been completed on the basis of the detected configuration. This judgment in step 214 can be carried out by judging whether the number of pulse signals which are outputted from the pulse signal generating device 36, which is provided at the rotation plate 28 at the top surface judging section 18, corresponds to a predetermined number. In this step 214, when it is established that the judgment on the quality of the top surface of the tire 12 has not yet been completed, the routine proceeds to step 216. In step 216, the rotation plate 28 is rotated by a predetermined amount, and thereafter, the routine proceeds to step 202 where the aforementioned processes are repeated.

In step 214, when all of the judgments on the quality of the entire top surface of the bead portion 12A of the tire 12 have been completed, the routine proceeds to step 218, where a filtering process is executed. The filtering process may be a process in which all of the collected data is examined, and the tire 12 is regarded as an abnormal tire only when there is a succession of abnormal portions in the same region on the top surface of the tire 12. Alternatively, the filtering process may be carried out by other methods. As a result, any noise and the like produced by the light projecting device 42 and the photographing device 44 can be eliminated from the collected data. Therefore, a normal tire can be prevented from being judged abnormal.

After the filtering process, in the following step 219, it is judged whether any abnormality has been found in the entire top surface of the bead portion 12A of the tire 12. When it has been judged that there is at least one abnormality, the tire 12 is determined to be abnormal, and the routine proceeds to step 213. On the other hand, when the tire 12 is judged to be free of any abnormalities, the routine proceeds to step 220, where it is indicated that the tire 12 is normal. Moreover, in step 213, a marking process for applying a visual mark to the displayed image such as coloring, forming bold (thicker) lines, circling or pointing to by arrow is carried out to a region where the image to be judged and the reference image are different from each other, and the resulting processed images are displayed on a display or the like with a mesh having an engineering scale (for example, 5 mm$^2$) under the images. This is helpful when an operator manually judges the quality of the tire 12 which has been classified as an abnormal tire. The process wherein the tire is classified as abnormal will be described later. Namely, when the operator judges the quality of the tire 12 visually, since the region where the image to be judged and the reference image are different from each other has been marked, it becomes easier for the operator to see the degree of the difference.

Thus, after the quality of the top surface of the tire 12 has been judged, this top surface configuration judging routine is completed, and the routine proceeds to step 108 in the control routine which is shown in FIG. 3.

In step 108 in the control routine, the tire 12 which is conveyed along the predetermined conveying path is held by the tire holding member 30 and is turned over 180°. Accordingly, the top surface and the rear surface of the tire 12 are reversed.

In the same manner as the aforementioned step 104, in step 110, it is determined whether the tire 12 is loaded on the loading surface of the rotation plate 28. In step 110, when it is established that the tire 12 is loaded on the rotation plate 28, the routine proceeds to step 112 where the rear surface configuration judging routine is executed. Namely, the external configuration of the bead portion 12A of the rear surface of the tire 12 is detected, and the quality of the tire 12 is thereby judged.

With reference to FIG. 5, the rear surface configuration judging routine will now be explained. Processes identical to those in the above-described top surface configuration judging routine are denoted by the same reference numerals and description thereof will be omitted.

In step 300, it is decided whether "the top surface" of the tire 12 which is loaded on the rotation plate 28 at the rear surface quality judging section 22, i.e., the surface now facing downward, was determined to be normal in the above-described top surface quality judging section 18. This judgment can be carried out by, for example, providing a mark or the like which is readable by a sensor (not shown) on the tire top surface in a case in which the quality of the top surface of the tire 12 has been judge to be normal in the top surface quality judging section 18, and determining the presence of the mark by the sensor. Alternatively, the quality of the top surface of the tire 12 can be judged by outputting an electrical ON/OFF signal.

In step 300, when it is confirmed that the quality of the top surface of the tire 12 has been judged to be normal at the top surface judging section 18, the routine proceeds to step 202. Namely, the rear surface configuration judging routine is executed only when the quality of the top surface of the tire 12 has been determined to be normal at the top surface quality judging section 18. Steps 202 through 220 are identical to the above-described processes, and description thereof will be omitted.

Then, when the judgment on the quality of the rear surface of the tire 12 at the rear surface judging section 22 has been completed, this rear surface configuration judging routine is finished, and the routine proceeds to step 114 in the control routine which is shown in FIG. 3.

In step 114, the tire 12 is classified on the basis of the results of the judgment on the quality of the tire 12 in the top surface configuration judging routine and the rear surface configuration judging routine. Namely, the tire 12 is automatically classified as a normal tire or an abnormal tire. The tire 12 which is classified as a normal tire in step 114 is conveyed to the subsequent process (for example, a vehicle assembly process). On the other hand, the tire 12 which has been classified as an abnormal tire is examined again by an operator. At this time, the operator judges the quality of the tire 12 while viewing the aforementioned geometrical images on the display.

As described above, since judgment on the quality of the tire 12 is carried out mechanically with constant referral to the reference, there are fewer instances of undesirable variation in the results of judgment. Further, because the tire 12 is rotated and turned over mechanically, the amount of labor borne by the operator can be reduced. As a result, the quality of the tire 12 can be judged easily and accurately.

In the present embodiment, as an example, a case in which the quality of the tire 12 is judged on the basis of the external configurations of the bead portions 12A of the tire 12 has been described. However, the present invention is not limited to the same. For example, the quality of the tire 12 can be judged by detecting the external configuration of the tread portion or the like of the tire 12.

Further, in the present embodiment, a system has been described in which the top surface quality judging section 18 and the rear surface quality judging section 22 are both provided, such that the configuration of the top surface bead portion 12A and the configuration of the rear surface bead portion 12A are detected separately. However, the present invention is not limited to this system. For example, the present invention can be structured such that the configuration judging device 10 is provided at each side along the conveying direction of the tire 12, such that the configurations of the top surface bead portion 12A and the rear surface bead portion 12A are detected at the same time. As a result, since it is not necessary to install the tire turn-over section 20, the tire classifying process system 14 can be made compact.

As mentioned above, a marking process for applying a visual mark to the displayed image such as coloring, forming bold (thicker) lines, circling or pointing to by arrow is carried out to a region where the image to be judged and the reference image are different from each other. When such abnormal regions where these images are different from each other occur continuously, the mark may be more conspicuous. In contrast, if such regions are isolated, a less conspicuous mark may be applied.

In summary, according to the present invention, since the judgment on the quality of the tire is carried out mechanically, the quality of the tire can be judged easily, accurately, and effectively.

What is claimed is:

1. A tire configuration judging device, comprising:

light irradiating means which irradiates slit light onto a predetermined range of a tire surface, whose configuration is to be detected, of a tire;

photographing means which is disposed at a predetermined position corresponding to said light irradiating means and which photographs a slit image formed on the tire surface by irradiation of the slit light by said light irradiating means;

configuration detecting means which detects the configuration of the tire surface whose configuration is to be detected, on the basis of the slit image which is photographed by said photographing means;

comparing means which compares the configuration which is detected by said configuration detecting means to a predetermined reference configuration; and judging means which judges the quality of the tire on the basis of the results of the comparison by said comparing means.

2. A tire configuration judging device according to claim 1, further comprising:

indication reading means which judges the type of the tire by reading an indication formed on a sidewall portion of the tire, wherein the reference configuration is specified in accordance with the type of the tire which is read by said indication reading means.

3. A fire configuration judging device according to claim 2, wherein said indication reading means includes a bar code reading sensor.

4. A tire configuration judging device according to claim 1, further comprising:

rotation means which rotates, in a circumferential direction of the tire, said light irradiating means, said photographing means, and the tire relative to one another, such that the entire tire surface whose configuration is to be detected can be irradiated by said light irradiating means and photographed by said photographing means, to thereby obtain the configuration of the entire tire surface.

5. A tire classifying method, comprising:

a tire type judging step in which a type of a tire is judged;

a quality judging step in which a tire surface whose configuration is to be detected is examined along a circumferential direction of the tire to detect the configuration of the tire surface, the detected configuration is compared to a predetermined reference configuration corresponding to the type of the tire which has been judged in said tire type judging step, and the quality of the tire surface is judged according to the results of the comparison; and a classifying step in which the tire is classified as a normal or abnormal tire on the basis of the results of the judgment in said quality judging step.

6. A tire classifying method according to claim 5, wherein in said quality judging step, if both surfaces of the tire are to be examined, after the configuration of one of the surfaces of the tire has been detected, the configuration of the other is detected by turning over the tire, so that the quality of the tire is judged on the basis of the configurations of both surfaces of the tire.

7. A tire classifying method according to claim 5, wherein in said quality judging step, the configurations of both surfaces of the tire are detected at the same time so that the quality of the tire is judged on the basis of the configurations of both surfaces of the tire.

* * * * *